United States Patent [19]
Kawano et al.

[11] Patent Number: 5,191,407
[45] Date of Patent: Mar. 2, 1993

[54] CONTOUR ACCENTUATION CIRCUIT FOR A COLOR SIGNAL

[75] Inventors: Mitsumo Kawano, Kumagaya; Tadashi Terada, Fukaya, both of Japan

[73] Assignee: Kabushiki Kaisha Toshiba, Kawasaki, Japan

[21] Appl. No.: 641,547

[22] Filed: Jan. 15, 1991

[30] Foreign Application Priority Data

Jan. 19, 1990 [JP] Japan .................. 2-8225

[51] Int. Cl.⁵ .................. H04N 9/64; H04N 5/52
[52] U.S. Cl. .................. 358/37; 358/174; 375/98
[58] Field of Search .................. 358/37, 166, 195.1, 358/174, 27; 375/98, 99

[56] References Cited

U.S. PATENT DOCUMENTS

| | | | |
|---|---|---|---|
| 3,515,804 | 6/1970 | Foote | 358/174 |
| 3,946,153 | 3/1976 | Peth et al. | 358/162 |
| 4,090,217 | 5/1978 | Goyal et al. | 358/37 |
| 4,327,373 | 4/1982 | Gomi | 358/27 |
| 4,400,721 | 8/1983 | Macovski | 358/37 |
| 4,581,631 | 4/1986 | Sonnenberger | 358/37 |
| 4,739,395 | 4/1988 | Johanndeiter et al. | 358/37 |
| 4,989,074 | 1/1991 | Matsumoto | 358/174 |

FOREIGN PATENT DOCUMENTS

| | | |
|---|---|---|
| 2326620 | 7/1978 | Fed. Rep. of Germany . |
| 2855880 | 6/1980 | Fed. Rep. of Germany . |
| 0019323 | 2/1979 | Japan . |
| 0145484 | 9/1982 | Japan . |
| 0036677 | 2/1990 | Japan . |

*Primary Examiner*—John K. Peng
*Attorney, Agent, or Firm*—Banner, Birch, McKie & Beckett

[57] ABSTRACT

A contour accentuation circuit for color signal comprises a variable gain amplifier, an output circuit and differential circuit. The output circuit outputs the signal according to the output signal from the variable gain amplifier and outputs the constant level signal to the output signal of amplitude level over predetermined level from the amplifier. The differential circuit differentiates the output signal from the output circuit and the amplifier amplifies and accentuates the contour of the input signal under the output control signal from the differential circuit.

17 Claims, 3 Drawing Sheets

CONTOUR ACCENTUATION CIRCUIT FOR A COLOR SIGNAL

BACKGROUND OF THE INVENTION

1. Field of the Invention

The present invention relates to the field of color video signal processing circuits and more particularly to a contour accentuation circuit for a color signal for use in video equipment such as a video cassette recorder or a television receiver.

2. Description of the Related Art

In a video cassette recorder or a television receiver, contour accentuation circuits are used for enhancement of clarity of pictures. In this case, contour accentuation means to steepen the rising edges or falling edges of wave forms. Typically, in general, a contour accentuation circuit includes a variable gain amplifier for amplifying an input signal, a detector for detecting the output signal from the amplifier and a differential circuit for differentiating the output signal from the detector and controlling the gain of the variable gain amplifier in accordance with the output control signal of the differential circuit.

In this prior art contour accentuation circuit, if the variable gain amplifier is constructed as an integrated circuit (IC), the amplifier is typically a Gilbert cell circuit which generally has a control characteristic related to the emitter equivalent resistance of a transistor. This emitter equivalent resistance r is nearly proportional to the emitter current of the transistor; therefore, the control characteristic of the amplifier is proportional to the gain control voltage of the amplifier. If a rising edge portion of a color signal is contour-accentuated, the larger the input signal of the amplifier becomes, the larger is the resultant gain of the amplifier, because the control voltage output of the differential circuit becomes larger (the differentiating value of the rising edge of the input wave form has a trend of being larger).

If the characteristic of the variable gain amplifier is determined to optimize the contour-accentuation for a color signal of large amplitude wave form, then accentuating the contour for a color signal of small amplitude becomes inadequate. Meanwhile, if the characteristic of the variable gain amplifier is determined to optimize the contour-accentuation for a color signal of small amplitude wave form, then the contour accentuating for the color signal of large amplitude becomes over-accentuating. In this over-accentuating case, a problematic ringing occurs at the rising edge portion of the color signal whose contours are accentuated (see lines 500 shown in FIG. 5).

SUMMARY OF THE INVENTION

Accordingly, it is an object of the present invention to provide an improved contour accentuation circuit which provides gain to an output signal having no ringing for all input signals. The circuit characteristic is determined so that the contours of signals whose amplitude are within a predetermined range are accentuated adequately without ringing.

In accordance with the present invention, the foregoing object is achieved by providing a video signal processor which comprises a variable gain amplifier characterized by a signal detector, responsive to the output of the variable gain amplifier, for providing an output signal proportional to the output of the variable gain amplifier within a predetermined range and for outputting an output signal of an approximately constant level above the predetermined range.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

The preferred embodiment of the present invention will now be described in more detail with reference to the accompanying drawings.

Figure 1:
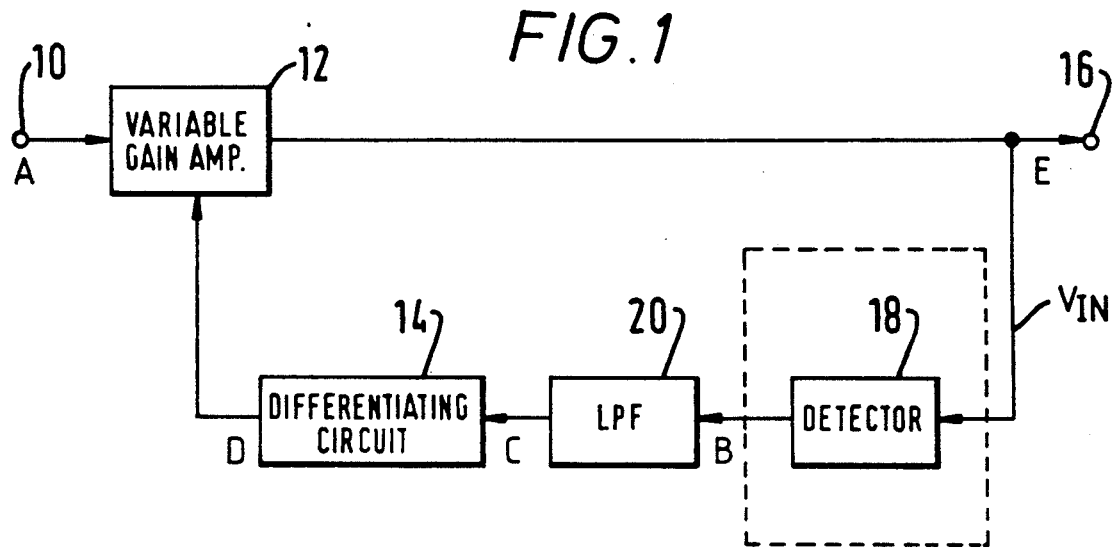
FIG. 1 provides a block diagram of a contour accentuation circuit for a color signal according to the present invention.

FIG. 1 is a block diagram of a contour accentuation circuit of one embodiment of the invention.

An input terminal 10 for receiving color signals is connected to a variable gain amplifier 12 whose gain is controlled by an output voltage from a differential circuit 14. The variable gain amplifier 12 for amplifying the color signal from the input terminal 10 is connected to an output terminal 16 for providing a contour-accentuated color signal, and to a detector 18. The detector 18 for detecting the output from the amplifier 12 is connected to a low-pass filter 20 for smoothing the output signal from the detector 18. The low-pass filter 20 is connected to the differential circuit 14.

The operation of the contour accentuation circuit is detailed below. In the circuit, the output color signal from the amplifier 12 is half wave rectified by the detector 18. The output signal from the detector 18 is smoothed by the low-pass filter 20. The output from the low-pass filter 20 is differentiated by the differential circuit 14. Lastly, a control signal output of the differential circuit 14 governs the gain of the amplifier 12. A high level control signal from the differential circuit 14 is supplied to the gain control terminal of the amplifier 12 at the rising edge portion of the input signal to the amplifier 12. A low level control signal from the differential circuit 14 is supplied to the gain control terminal of the amplifier 12 at the falling edge portion of the input signal to the amplifier 12. Thus, the amplifier 12 operates to increase the gain at the rising edge portion of the input signal to the amplifier 12 and decrease the gain at the falling edge portion of the input signal to the amplifier 12. In this manner, the contour of the output signal from the amplifier 12 is accentuated. According to the present invention, in accordance with a detector as shown in FIG. 2, ringing is prevented on the output color signal at the output terminal 16.

Figure 2:
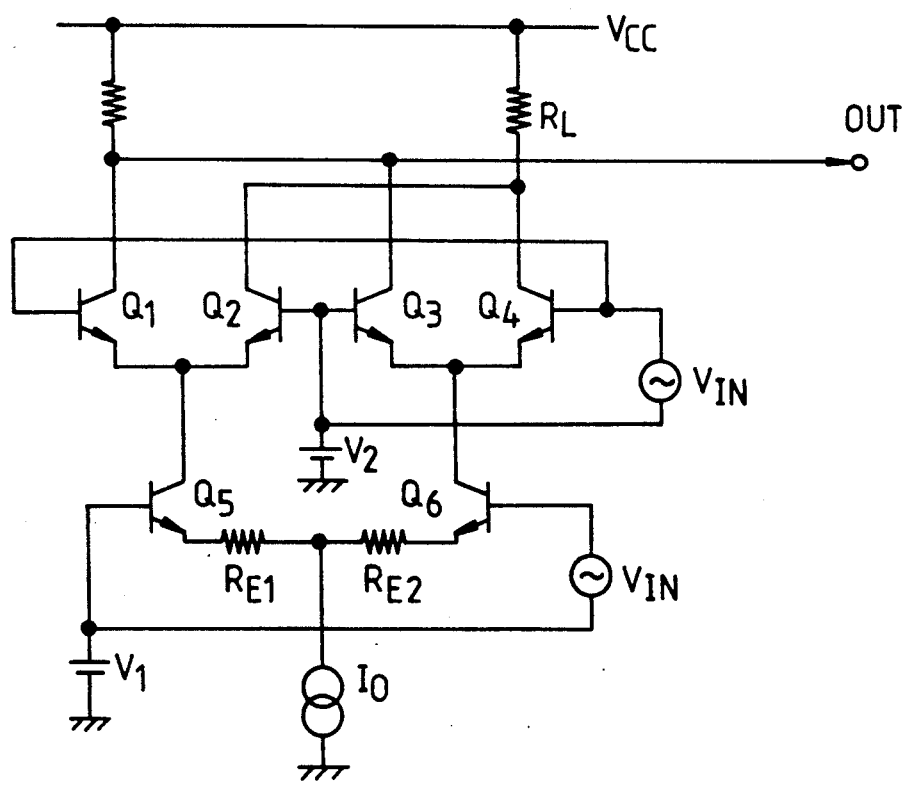
FIG. 2 provides a circuit diagram of an example of the detector as shown in FIG. 1.

FIG. 2 is a circuit diagram of an example of the detector 18 as shown in FIG. 1.

In FIG. 2, transistors Q1 and Q2 form a first differential circuit. Transistors Q3 and Q4 also form a second differential circuit. The emitters of the transistors Q1 and Q2 are connected to a constant current source Io through a transistor Q5 and a resistor RE1. The emitters of the transistors Q3 and Q4 are connected to the constant current source Io through a transistor Q6 and a resistor RE2. The collectors of the transistors Q1 and Q3 are connected to each other. The collectors of the transistors Q2 and Q4 are connected to each other. An input signal $V_{IN}$ is supplied to the bases of the transistors Q5 and Q6. The input signal $V_{IN}$ is also supplied to the bases of the transistors Q3 and Q4. A load resistor RL is connected to the collectors of the transistors Q2 and Q4. An output terminal is connected to the collectors of the transistors Q1 and Q3.

Figure 3:
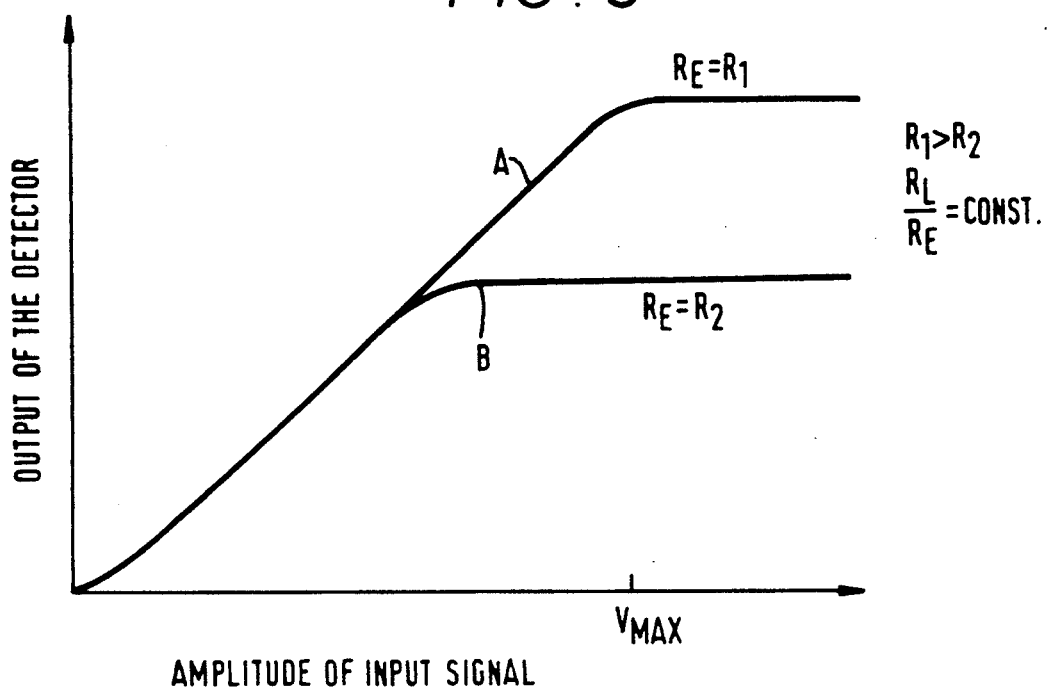
FIG. 3 provides a characteristic of detection of the detector as shown in FIG. 2.

The relationship between the input dynamic range of the detector as shown in FIG. 2 and the amplitudes of input signals is shown in FIG. 3. The input dynamic range of the detector as shown in FIG. 2 is defined by the resistance values RE of the resistors RE1, RE2 multiplied by the current value of the constant current source Io.

If the resistance value RL of the load resistor RL and the current value Io are constant, the larger the resistance value RE becomes, the larger the input dynamic range becomes as shown in FIG. 3. If the range of the input signal is predetermined and the maximum value of the amplitude of the input signal rises to Vmax, the resistance value RE determines the operational range of the detector 18.

In general, current value Io and resistance value RE of the detector 18 is defined so as to output signals proportional to the input signal's amplitude (see the characteristic curve A shown in FIG. 3). But in accordance with the embodiment, the resistance values RE of the resistors RE1, RE2 of the detector 18 are defined so that the operational range of the detector 18 includes a linear range and a non-linear (limiter) range (see the characteristic curve B shown in FIG. 3). That is, an output value of the detector of the input signal of over a predetermined value is limited, the output value of the detector does not increase higher than a predetermined value.

Figure 4:
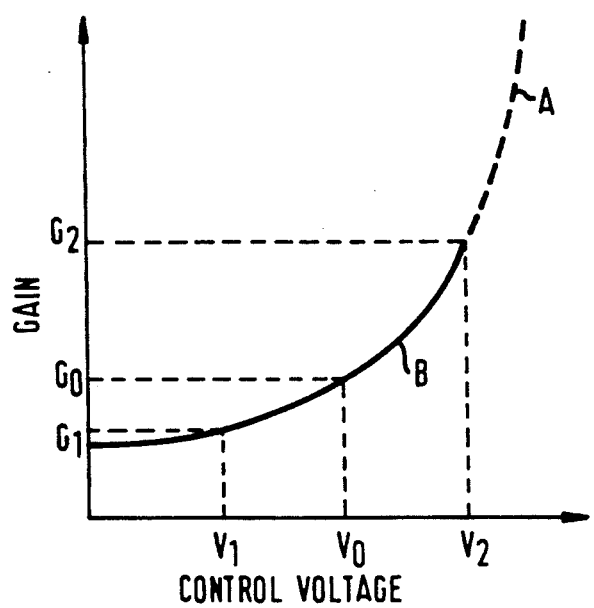
FIG. 4 provides a characteristic of the variable gain amplifier as shown in FIG. 1.

The characteristics of the contour accentuation circuit shown in FIG. 1 is stated below on condition that the operational range of the detector 18 is defined to have a non-linear range as stated above. The control characteristic of the variable gain amplifier 12 is shown in FIG. 4. The curve A (a line portion and a dotted line portion) shows that the gain of the variable gain amplifier 12 is nearly proportional to the control voltage from the differential circuit 14. Where the control voltage to the color signal whose contours are accentuated visually varies V1 through V2, gain G2 at the control voltage V2 is needed to maximize the effect of the contour accentuation visually.

Figure 5:
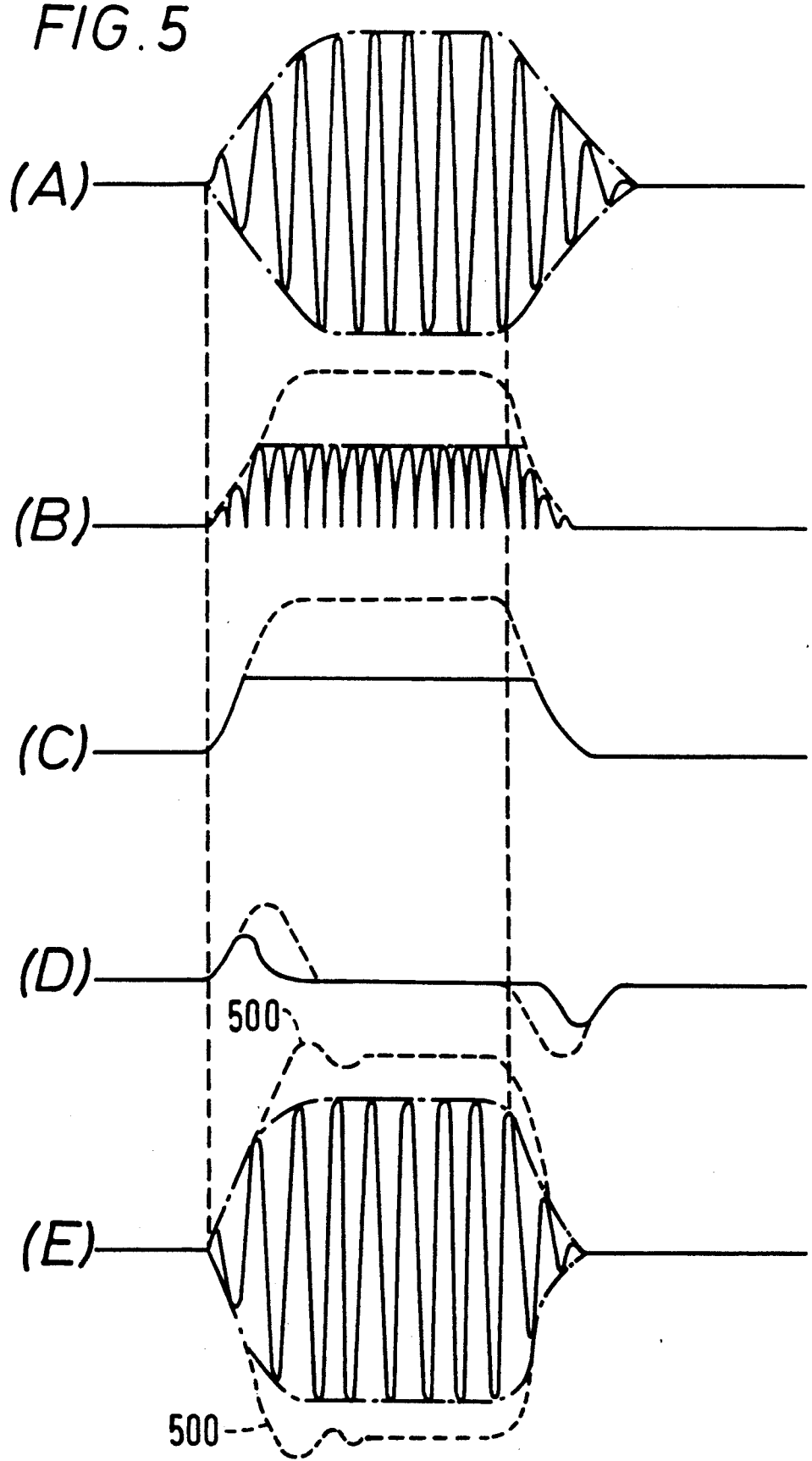
FIG. 5 provides the wave forms of some points of the contour accentuation circuit for a color signal as shown in FIG. 1.

The characteristic of the variable gain amplifier 12 is shown as the characteristic curve B (a solid line portion) shown in FIG. 4. That is, the control voltage supplied to the variable gain amplifier 12 is limited within V2. Thus, the ringing does not occur in the color signal whose contours are accentuated. FIG. 5 shows some wave forms of some points of the circuit shown in FIG. 1. In this FIG. 5, the level of the input signal has a large amplitude. FIG. 5(A) is an input color signal A to the variable gain amplifier 12, and FIG. 5(B) is an output detected signal B from the detector 18.

FIG. 5(C) is an output signal C from the low-pass filter 20 which smooths the detected signal from the detector 18. FIG. 5(D) shows an output control signal D from the differential circuit 14. FIG. 5(E) is an output signal E from the variable gain amplifier 12 which accentuates the contour of the input color signal A under the control signal D from the differential circuit 14.

If the detector 18 does not have a limiter characteristic such as the embodiment mentioned above, each output signal B through E becomes to be as dotted lines as shown in FIGS. 5(B) through 5(E), respectively. In FIG. 5(E), the dotted line 500 shows the occurrence of the ringing.

In the above embodiment, the color signal is supposed to be a television video signal. However, the color signal is not limited to that of the present broadcasting system. This invention may be applied to other signals of many other kinds of video systems (equipment) such as high definition television, picture phone, etc.

What is claimed is:

1. A video signal processor for use in a video apparatus comprising:
   a variable gain amplifier for amplifying an input video signal to produce an amplified video signal;
   an output terminal connected to receive the amplified video signal for supplying an output video signal;
   a signal detector, connected to receive the amplified video signal, for generating a detection signal, the amplitude of a picture content portion of the detection signal being proportional to the amplitude of the picture content portion of the amplified video signal when the amplitude of the amplified video signal is within a predetermined range and being at an approximately constant value when the amplitude of the picture content portion of the amplified video signal exceeds the predetermined range; and
   a processing circuit for processing the detection signal and for supplying the processed detection signal to the variable gain amplifier to control the gain thereof.

2. A video signal processor as claimed in claim 1, wherein the input video signal is a color signal.

3. A video signal processor as claimed in claim 1, wherein said signal detector comprises a double-balanced differential circuit.

4. A video signal processor as claimed in claim 3, wherein the double-balanced differential circuit comprises:
   a first differential circuit;
   a second differential circuit balancing the first differential circuit; and
   a constant current source connected to the first and the second differential circuits.

5. A video signal processor as claimed in claim 4, wherein the first differential circuit comprises a first and a second transistor, the second differential circuit comprises a third and a fourth transistor, and the constant current source is connected to the first and the second differential circuit through a first series circuit of a fifth transistor and a first resistor and a second series circuit of a sixth transistor and a second resistor, respectively.

6. A contour accentuation circuit for a color signal comprising:
   a variable gain amplifier for amplifying an input color signal to produce an amplified color signal;
   an output terminal connected to receive the amplified color signal for supplying an output color signal;

a nonlinear circuit, connected to receive the amplified color signal, for outputting a signal having an amplitude which is proportional to the amplified color signal amplitude when the amplified color signal amplitude is within a predetermined range, and which is at a saturated level when the amplified color signal amplitude exceeds the predetermined range; and a differential circuit for differentiating the signal from said nonlinear circuit and supplying the differential signal to the variable gain amplifier as a gain control signal.

7. A contour accentuation circuit for a color signal as claimed in claim 6, wherein the nonlinear circuit is a detector.

8. A contour accentuation circuit for a color signal as claimed in claim 7, wherein the detector comprises a double-balanced differential circuit.

9. A contour accentuation circuit for a color signal as claimed in claim 8, wherein the double-balanced differential circuit comprises:
   a first differential circuit;
   a second differential circuit balancing the first differential circuit; and
   a constant current source connected to the first and the second differential circuits.

10. A contour accentuation circuit for a color signal as claimed in claim 9, wherein the first differential circuit comprises a first and a second transistor, and the second differential circuit comprises a third and a fourth transistor, and the constant current source is connected to the first and the second differential circuit through a first series circuit of a fifth transistor and a first resistor and a second series circuit of a sixth transistor and a second resistor, respectively.

11. A contour accentuation circuit for a color signal as claimed in claim 6, wherein the variable gain amplifier comprises a Gilbert cell circuit.

12. A contour accentuation circuit for a color signal as claimed in claim 11, wherein the Gilbert cell circuit is formed in an integrated circuit.

13. A contour accentuation circuit for a color signal as claimed in claim 6, further comprising a low-pass filter connected between the nonlinear circuit and the differential circuit.

14. A method of accentuating contours of a color signal for use in a video apparatus comprising the steps of:
   amplifying an input color signal with a variable gain amplifier;
   detecting the amplified color signal including generating a detected signal having an amplitude which is proportional to the amplitude of the amplified color signal when the amplitude of the amplified color signal is within a predetermined range and which is substantially constant when the amplitude of the amplified color signal exceeds the predetermined range;
   differentiating the detected signal; and
   controlling the gain of the variable gain amplifier in accordance with the differential signal.

15. A contour accentuating circuit comprising:
   a variable gain amplifier having a first input terminal for receiving an input signal, a second input terminal for receiving a gain control signal, and an output terminal for outputting an amplified signal;
   gain control means, having an input terminal connected to the output terminal of said variable gain amplifier and an output terminal connected to the second input terminal of said variable gain amplifier, for supplying a gain control signal to said variable gain amplifier, said gain control signal being the differential of a signal having an amplitude which is proportional to the amplitude of the amplified signal when the amplitude of the amplified signal is within a predetermined range and which is substantially constant when the amplitude of the amplified signal exceeds the predetermined range.

16. The contour accentuating circuit according to claim 15, wherein said gain control means comprises:
   a detector connected to the output terminal of said variable gain amplifier;
   a low pass filter connected to said detector for filtering the detected signal;
   a differential circuit for differentiating the filtered signal and for supplying the differentiated signal to the second input of the variable gain amplifier.

17. The contour accentuation circuit according to claim 16, wherein said detector comprises a double-balanced differential circuit.

* * * * *